United States Patent [19]
Miller

[11] Patent Number: 5,917,613
[45] Date of Patent: Jun. 29, 1999

[54] FACSIMILE HAVING A MULTI-PATH, CONTEXT INTERPRETIVE, USER INTERFACE

[75] Inventor: William Scott Miller, Oceanside, Calif.

[73] Assignee: Hewlett-Packard Co., Palo Alto, Calif.

[21] Appl. No.: 08/592,246

[22] Filed: Jan. 26, 1996

Related U.S. Application Data

[63] Continuation of application No. 08/376,056, Jan. 20, 1995, abandoned, which is a continuation of application No. 08/136,074, Oct. 13, 1993, abandoned.

[51] Int. Cl.[6] .............................. H04N 1/32; H04N 1/00
[52] U.S. Cl. ......................... 358/442; 358/400; 345/157
[58] Field of Search .................................... 358/400, 401, 358/440, 442, 444, 468; 345/156, 157, 173; 341/23

[56] References Cited

U.S. PATENT DOCUMENTS

| | | | |
|---|---|---|---|
| 4,007,443 | 2/1977 | Bromberg et al. | 341/23 |
| 4,481,508 | 11/1984 | Kamei et al. | 341/23 |
| 4,994,926 | 2/1991 | Gordon et al. | 358/440 |
| 5,208,683 | 5/1993 | Okada | 358/468 |
| 5,247,370 | 9/1993 | Takaoka | 358/440 |

*Primary Examiner*—Thomas D. Lee

[57] ABSTRACT

An operator/facsimile interface enables entry of alpha-numeric data from a telephone-style keyboard. Alteration of displayed alpha-numeric characters may be accomplished by actuation of arrow keys or segential key presses of an alpha-numeric key A displayed alpha-numeric character may be entered by actuation of an arrow key, an Enter key or a different alpha-numeric key. Completion of an alpha-numeric entry may be signaled by actuation of a Start key or Enter key. The operator/facsimile interface enables a telephone number to be stored for subsequent recall by any of five separate procedure pathways. The combination of the above operator/facsimile interface features provides the operator with plural pathways to accomplish facsimile functions, thereby avoiding the single path per procedure prior art constraint.

19 Claims, 9 Drawing Sheets

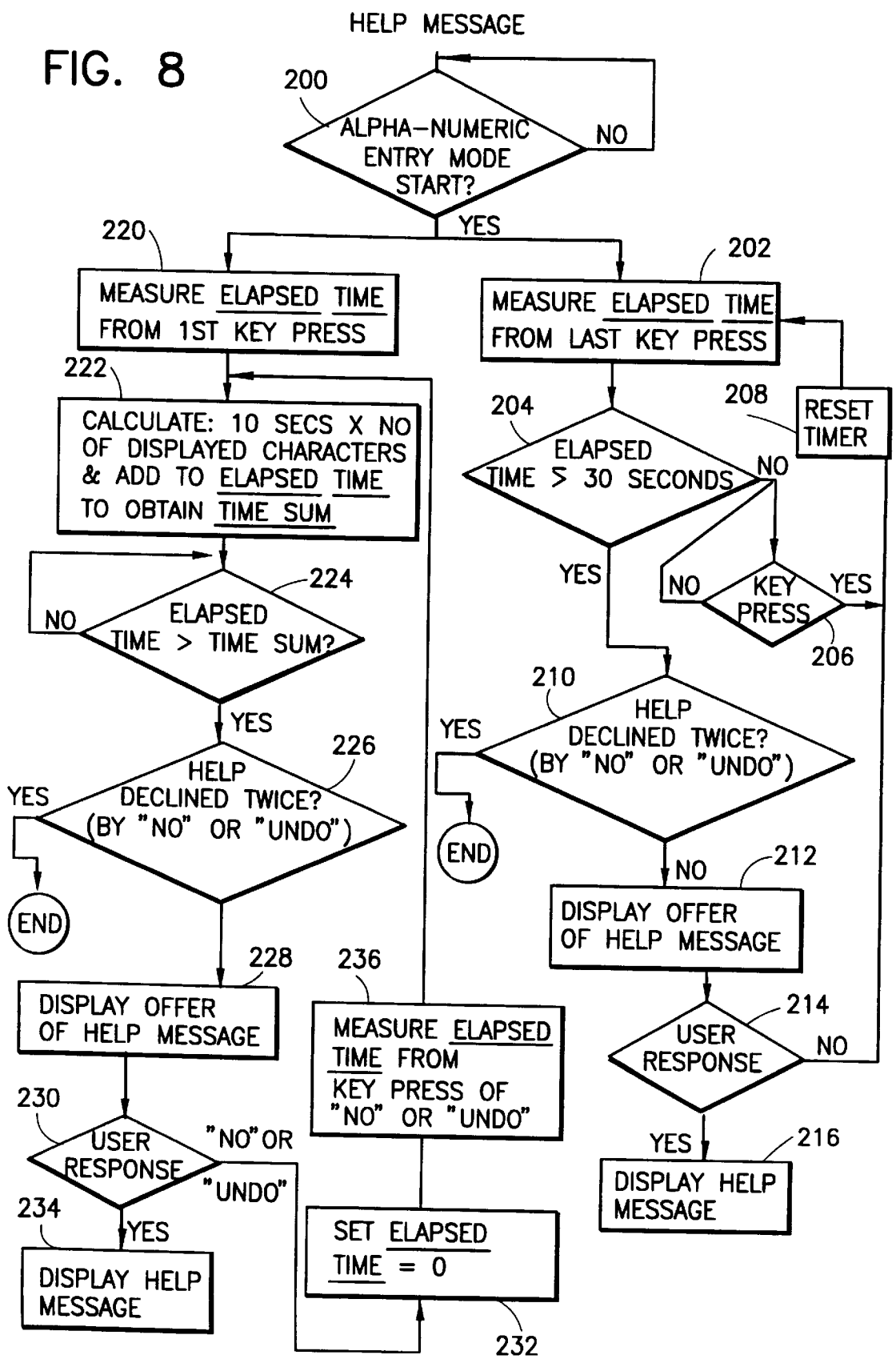

FACSIMILE HAVING A MULTI-PATH, CONTEXT INTERPRETIVE, USER INTERFACE

This is a continuation of application Ser. No. 08/376,056 filed Jan. 20, 1995, which is a continuation of Ser. No. 08/136,074, filed Oct. 13, 1993, both now abandoned.

FIELD OF THE INVENTION

This invention relates to facsimile apparatus, and more particularly, to an operator interface for a facsimile that provides multiple, alternative, input paths to accomplish procedures employed by the facsimile.

RELATED U.S. PATENT APPLICATIONS

"Facsimile Having a User Interface with Automatic Offer of Help Message", W. S. Miller, U.S. patent application Ser. No. 08/135,834 filed on even date herewith (Attorney Docket No. 1093517-1).

"Facsimile Having User Interface Keys that Enable UNDO, YES, NO and Report Functions", W. S. Miller, U.S. patent application Ser. No. 08/135,833 filed on even date herewith (Attorney Docket No. 1093519-1).

BACKGROUND OF THE INVENTION

Once a facsimile machine has been properly set up by the operator, it operates in a substantially automatic mode to accomplish its connection, transmission and sign-off functions. If the facsimile includes a "one-touch" feature wherein actuations of each of a plurality of single buttons accesses prestored telephone numbers, the transmitting fax machine, upon actuation of one such button, automatically dials the remote telephone number and transmits a standard recognition signal which the receiving facsimile acknowledges. Then, the transmitting and receiving facsimiles send short messages back and forth to select the highest speed possible before sending the documents. No action is required of an operator during this action, at either the sending or the receiving end. When a transmission is completed the facsimile units automatically disconnect and the receiving facsimile provides hard copy for the operator.

While transmission and reception operations of a facsimile are highly automated and require little or no operator input, such "user-friendliness" is often not manifest when an operator wishes to input instructions or data into the facsimile via a control panel. Facsimile/operator interfaces typically recognize only a single sequence of operations to accomplish a given input task. To determine the correct procedure sequence, the operator must refer to an instruction manual and follow its instructions slavishly to assure proper accomplishment of a desired task. Any deviation from the required sequence of operations will prevent the accomplishment of the desired task.

Facsimile operator panels employ multiple keys that enable multiple functions to be accomplished—assuming the operator is aware of the proper sequence of key activations. Because of both cost and size restraints, little directory information is contained on the face of the operator panel other than short key names. Certain key names are ambiguous and lead to user confusion as to the exact function to be performed by the key.

For any given facsimile task, there are usually a number of different "reasonable" approaches an operator might take to accomplish the task—assuming that the operator has not reviewed the facsimile's manual. Each different approach will be taken by some percentage by the operator population. The traditional facsimile interface appears intuitive to only that group of operators whose approach was implemented by the designers of the operator panel. Since modern facsimiles are sold worldwide and operator panels are used by operators from many cultures, the use of rigorous single-path procedures to accomplish facsimile-related tasks leads to user frustration and resulting dissatisfaction with the facsimile product—even though the facsimile operates in a perfectly appropriate manner when operated "according to the book".

Accordingly, it is an object of this invention to provide an improved operator/facsimile interface which provides multiple procedure paths to accomplish tasks related to the facsimile unit's operation.

It is another object of this invention to provide an improved operator/facsimile interface wherein procedure paths for accomplishing facsimile input functions are specifically designed to duplicate intuitive input procedures expected from plural operator populations.

It is yet another object of this invention to provide an improved operator interface for a facsimile wherein actuation of a single key enables reversal of discrete operator inputs.

It is still a further object of this invention to provide an improved operator/facsimile interface wherein an offer of help message is displayed, based upon an assumed need for assistance.

SUMMARY OF THE INVENTION

An operator/facsimile interface enables entry of alpha-numeric data from a telephone-style keyboard. Alteration of displayed alpha-numeric characters may be accomplished by actuation of arrow keys, or sequential key presses of an alpha-numeric key. A displayed alpha-numeric character may be entered by actuation of an arrow key, an Enter key or a different alpha-numeric key. Completion of an alpha-numeric entry may be signaled by actuation of a Start key or Enter key. The operator/facsimile interface enables a telephone number to be stored for subsequent recall by any of five separate procedure pathways. The combination of the above operator/facsimile interface features provides the operator with plural pathways to accomplish facsimile functions, thereby avoiding the single path per procedure prior art constraint.

DESCRIPTION OF THE DRAWINGS

FIG. 8 is a high level flow diagram illustrating when an offer of help message is displayed.

DETAILED DESCRIPTION OF THE INVENTION

Facsimile Unit

Figure 1:
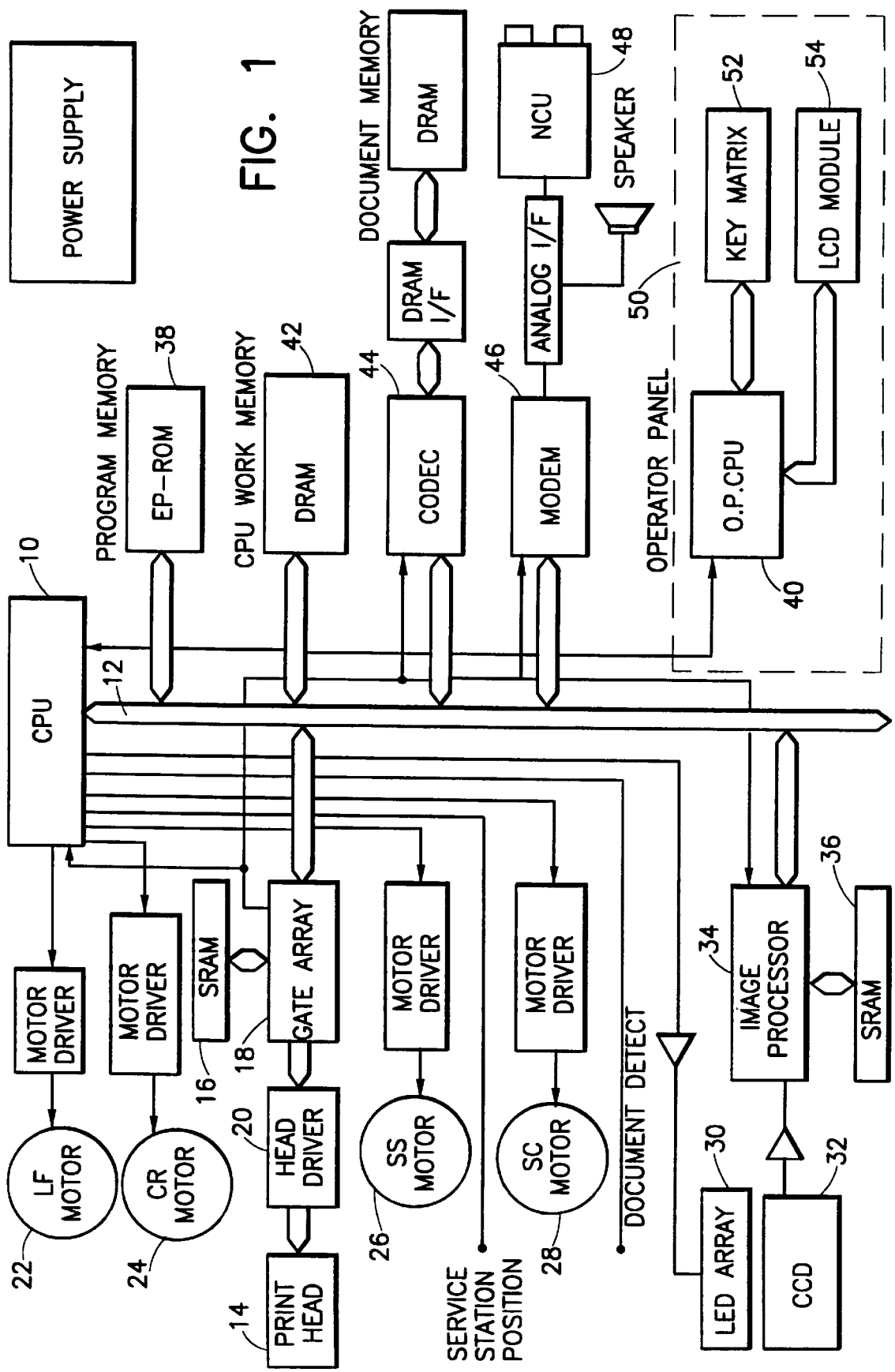
FIG. 1 is a high level block diagram of a facsimile that incorporates the invention hereof.

FIG. 1 is a block diagram of a facsimile that incorporates an improved operator/facsimile interface. The facsimile is controlled by a central processing unit (CPU) 10 which communicates with all of the main elements of the facsimile via a bus 12. The facsimile utilizes an ink jet print head 14 to provide hard copy output. A static random access memory (SRAM) 16 receives picture element data from CPU 10 via a gate array 18. Picture element data is fed from SRAM 16 on an as-needed basis via head driver 20 to an ink jet printhead 14.

A plurality of motors are controlled by CPU 10 to perform various functions within the facsimile. Motor 22 provides a line feed (LF) drive function for a document being scanned. Motor 24 controls the movement of the carriage (CR) that carries printhead 14. Motor 26 controls the operation of the service stations (SS) at which printhead 14 is parked when not in use. Motor 28 controls sheet feed (SC) from a paper supply to and past printhead 14.

LED array 30 and CCD array 32, in the known manner, scan a document to be transmitted and provide image data to image processor 34 and an SRAM 36. A program memory 38 stores the main control program for CPU 10. An operator panel CPU 40 is dedicated to assisting in the control of operator panel functions. The facsimile also includes a CPU work memory 42 and a coder/decoder 44 (CODEC) that provides data encoding/decoding functions for both incoming and outgoing data. A modem 46 provides standard telephone line interface function for signals that are fed through a network control unit 48 to and from the public switched telephone network.

Figure 2:
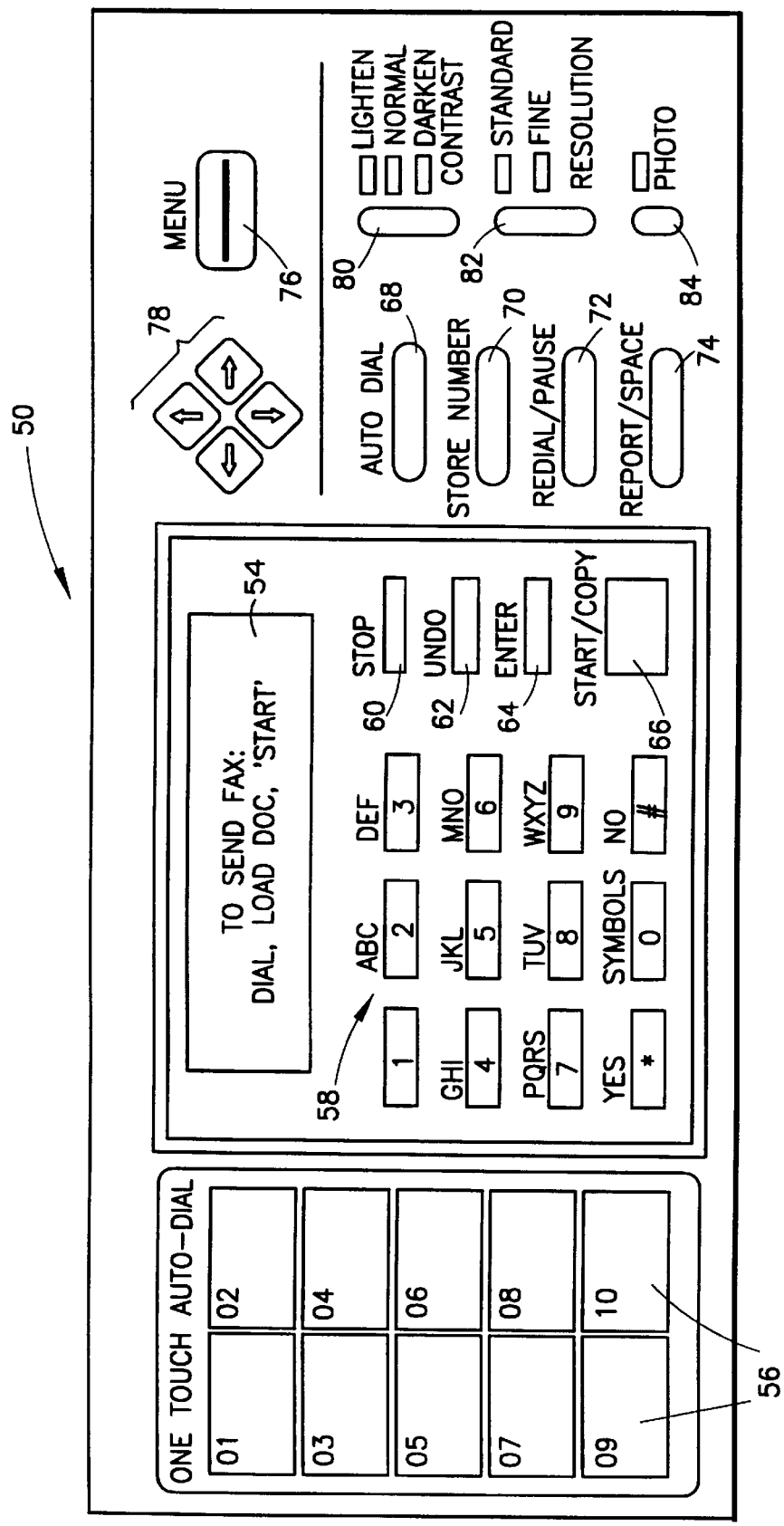
FIG. 2 is a plan view of an operator panel constructed in accordance with the invention.

Operator panel 50 provides an operator/facsimile interface and includes a key switch matrix 52 and a liquid crystal display (LCD) module 54. A plan view of operator panel 50 is shown in FIG. 2 with LCD display 54 indicating a standard default message on its face Operator panel 50 includes a plurality of "one-touch" auto-dial keys 56 each of which, when actuated causing an automatic dialing of a pre-loaded telephone number. A telephone-style 12 button key set 58 is positioned in the center of operator panel 50 and provides alpha-numeric input capability for the facsimile. Key set 58 is substantially similar to that found on the normal telephone except as follows: the "7" key has assigned to it alphabetic character Q; the "9" key has assigned to it the alphabetic character Z; the * key is, under certain circumstances, recognized as a YES input to the facsimile;e the # key is recognized under certain circumstances as a No input from an operator; and the "0" key enables display of a plurality of symbols on display 54.

When the facsimile is in a dial mode, such as indicated in FIG. 2 by display 54, actuation of one of alpha-numeric keys 58 will cause the numeral assigned to the actuated key to be entered and displayed on display panel 54. When however, the facsimile is in an alpha-numeric mode, depression of one of keys 58 will cause either an assigned numeric or alphabetic character to be displayed in a character position on display panel 54 at which a cursor is present. Further details of the alpha-numeric mode will be discussed below.

A plurality of function keys are included in operator panel 50. Operator actuation of STOP key 60 causes whatever function is in process in the facsimile to immediately cease and for the facsimile to reset to a default state (e.g. that shown on display 54). Actuation of Undo key 62 enables reversal of an immediately prior entry, without causing reset of the facsimile to the default state. The operation of the Undo key will be described in detail below An Enter key 64, when actuated causes a displayed cursor on display 54 to move to a next character position while the previous character position remains in its existing state. Start key 66, when actuated enables commencement of a facsimile transmission or a copy function when the facsimile is in a copy mode. As will become apparent below, both Start key 66 and Enter key 64 are, at times, recognized as commanding a commencement of a task. In a similar manner, Undo key 62 and the #/no alpha-numeric key are recognized by the facsimile, under certain circumstances, as providing a negative operator answer. Additionally, the #/yes key is sometimes recognized as an affirmative operator answer.

Auto-dial key 68 enables access to one of a plurality of stored telephone numbers. As will be understood from the description below, an actuation of Auto-dial key 68 causes display of one of a list of telephone numbers available for automatic dialing. In order to select a particular telephone number to be dialed, the operator increments the display to a particular storage location where the desired telephone number is located. Then, by activation of either Enter key 64 or Start key 66, the Auto-dial function is commenced. The Auto-dial function preferably stores many more telephone numbers than are available for actuation by one-touch Auto-dial keys 56. Thus, for example, the Auto-dial function may enable any one of 50 telephone numbers to be selectively accessed, whereas One-touch Auto-dial keys 56 only enables 10 such numbers to be automatically actuated by operator selection of one such key.

A Store Number key 70 provide the operator with a capability to insert a new telephone number into the Auto-dial listing. As will become apparent, in addition to Store Number key 70 enabling storage of a telephone number, there are four other procedures which may be followed by an operator to accomplish storage of a telephone number. In each instance, the procedure is in accordance with an expected series of steps which an operator might take in attempting to store a telephone number. The Store Number procedure will be described below in relation to the flow diagrams of FIGS. 4 and 5.

Report key 74 enables selective readout of a facsimile state. When Report key 74 is actuated first by the operator, the following appears on display 54:

PRINT REPORT (1–4)

1: LAST TRANSACTION

To select a print-out of the last transaction (number of pages successfully transmitted, destination of the facsimile, etc), the user presses Report key 74 a second time and a transaction print-out occurs. Should another print-out be desired (e.g., last 32 transactions) then the operator sequences down the 4 items of the Print Report menu to find the desired entry. At such time, actuation of Report key 74 causes the desired print-out As a result, Report key 74 enables a print-out only when one is desired by the operator, and avoids unnecessary print-outs which occur automatically in the prior art.

A menu key 76 enables presentation on display 54 of a plurality of facsimile functions which may be implemented by an operator. Some of the displayed functions duplicate those that may be accomplished by selective operation of one or more function keys or alpha-numeric keys. Arrow keys 78 provide movement control of a cursor shown on display panel 54. They also provide the operator with an ability to increment through plural value selections or to move up or down through procedures indicated on display panel 54 as a result of an actuation of menu key 76.

The remaining controls on operator panel 50 (i.e. contrast button 80, resolution button 82, and photo button 84 enable alteration of the respective functions in accordance with operator choices. These functions are not relevant to the invention described herein.

From the description of the functions of each of the keys on operator panel 50, it can be seen that the operator has plural methods for causing a task to be accomplished or a value to be changed or various menu functions sequenced through display panel 54. As a result, the operator/facsimile interface does not rely upon a single predetermined path to accomplish many of the tasks required during operation of the facsimile.

Alpha-numeric Entry Procedures

Figure 3A:
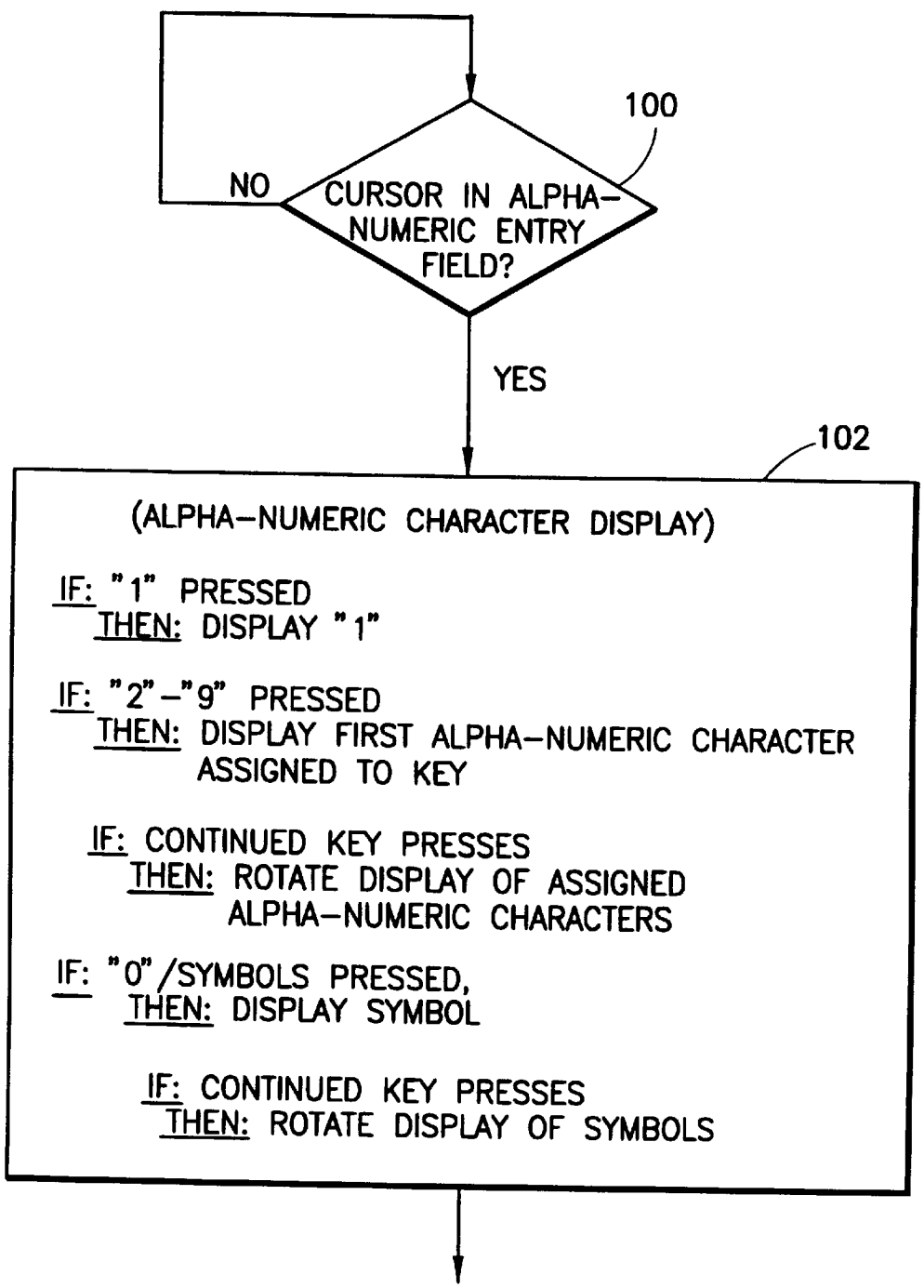
FIGS. 3a and 3b illustrate a flow diagram of operator/facsimile interface functions during an alpha numeric entry mode.
Figure 3B:
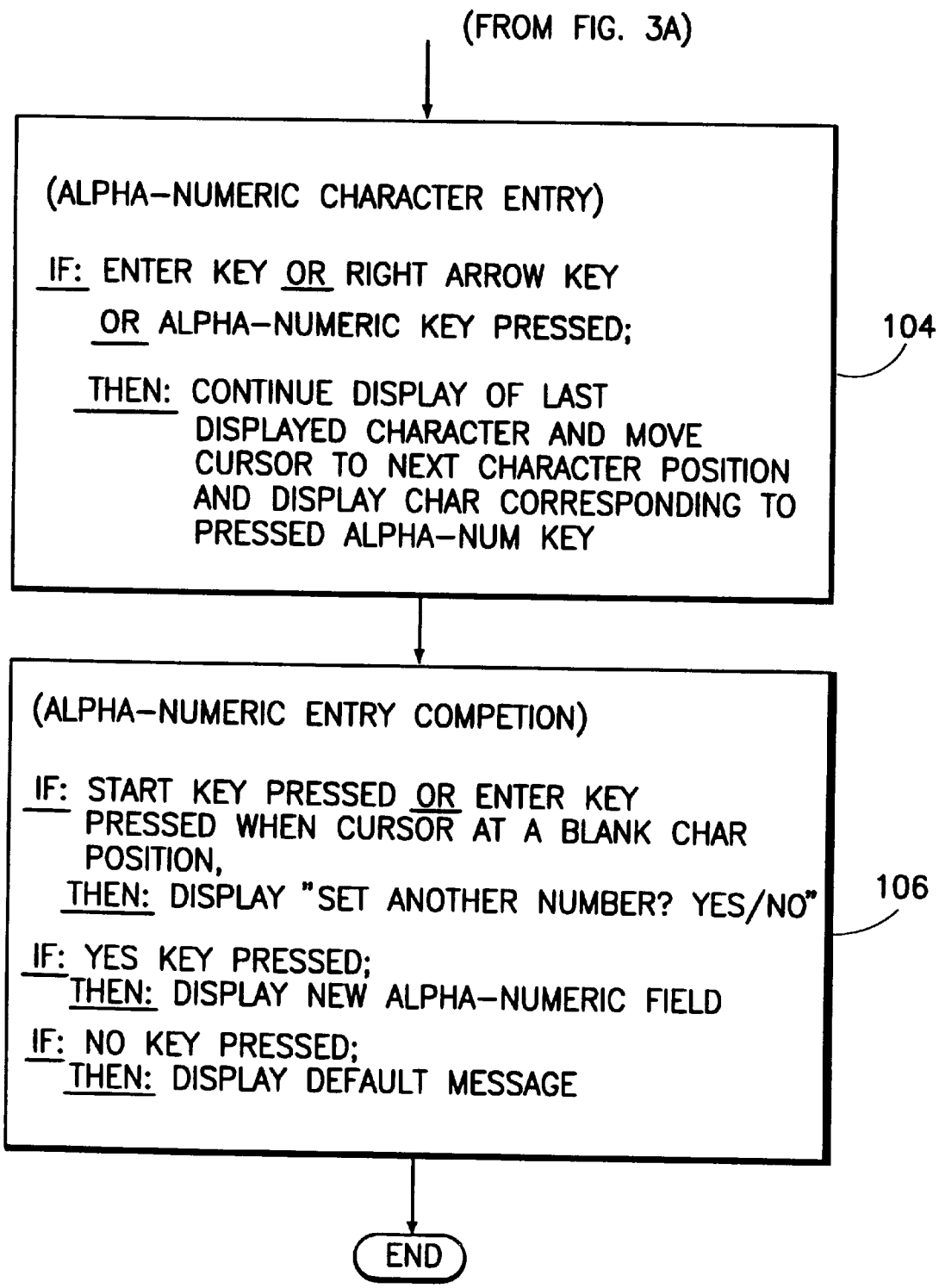

Turning to FIG. 3, a logical flow diagram is shown that illustrates methods available for alpha-numeric entry of characters into an alpha-numeric field on display panel 54. Initially, it is assumed that a cursor on display 54 is positioned within a field which is adapted to display alpha-numeric characters (box 100). The various instances during which fields on display 54 are capable of receiving alpha-numeric entries will be described with respect to procedures illustrated in FIGS. 4–8.

To display an alpha-numeric character, one of alpha-numeric keys 58 on operator panel 50 may be selectively operated in the manner shown in box 100. More specifically, if the "1" key is pressed, then a 1 is displayed in the alpha-numeric field. If keys indicating "2"–"9" are pressed, then a first alpha-numeric character assigned to the respective key is displayed. For instance, if key "2" is pressed, the letter A will initially appear. If the same key is pressed again, then a next in the series of characters assigned to the key is displayed (e.g. "B"), etc. Successive presses of the "2" key will successively cause display of characters. "A", "B", "C" and "2". Continued presses of a key will cause a continued "rotation" of displayed characters at a display character position where a cursor is displayed.

A similar rotation of displayed characters can be achieved after a particular alpha-numeric key 58 has been pressed, by continued actuations of either of the up or down arrow keys 78. Those keys will respectively cause opposite sequence rotations of the indicated characters.

If the "0" alpha-numeric key 58 is actuated, a symbol (e.g., +, −, x, etc.) is displayed at the character position on display 54 where the cursor is positioned. Continued actuations of the "0" key enable a sequential display of assigned symbols (including the "0" value) through the cursor-indicated character position on display panel 54. Actuation of the up or down arrow keys 78 will also cause a sequencing of displayed characters.

While sequential alpha-numeric key presses or actuation of the up or down arrow keys can cause display of characters or symbols on display panel 54, such actions do not achieve an "entry" of the displayed alpha-numeric character. Such action is achieved (see box 104) by operator actuation of either Enter key 64, or the right arrow key of arrow keys 78, or a next alpha-numeric key. Any of those actions signal to the facsimile that the alpha-numeric character presently indicated at the cursor position is to continue to be displayed and the cursor is to be moved to a next character position. In the case where a next alpha-numeric key is actuated, not only does the cursor move to the next character position but the alpha-numeric character assigned to the next actuated key is displayed.

Once the operator has completed entry of all desired alpha-numeric characters into an alpha-numeric field on display panel 54, such completion may be signalled by the operator pressing Start key 66 or Enter key 64 when the cursor is present at a blank character position (box 106). At such point, a query message is presented on display panel 54 which asks: "Set Another Number? yes/no". In response, actuation of the * key of alpha-numeric keys 58 designates a Yes, while actuation of the # key designates a No. If No is pressed, a default message is presented (e.g., such as shown at display 54 in FIG. 2). If the Yes key is pressed, a further alpha-numeric entry field is displayed and the process is available for repetition. By providing individual keys having Yes/No functions in the alpha-numeric mode, the user need not use the "9" and "6" keys to obtain access to the "y" and "n" alphabetic characters to designate a yes or no answer.

Telephone Number Storage Procedures

Figure 4:
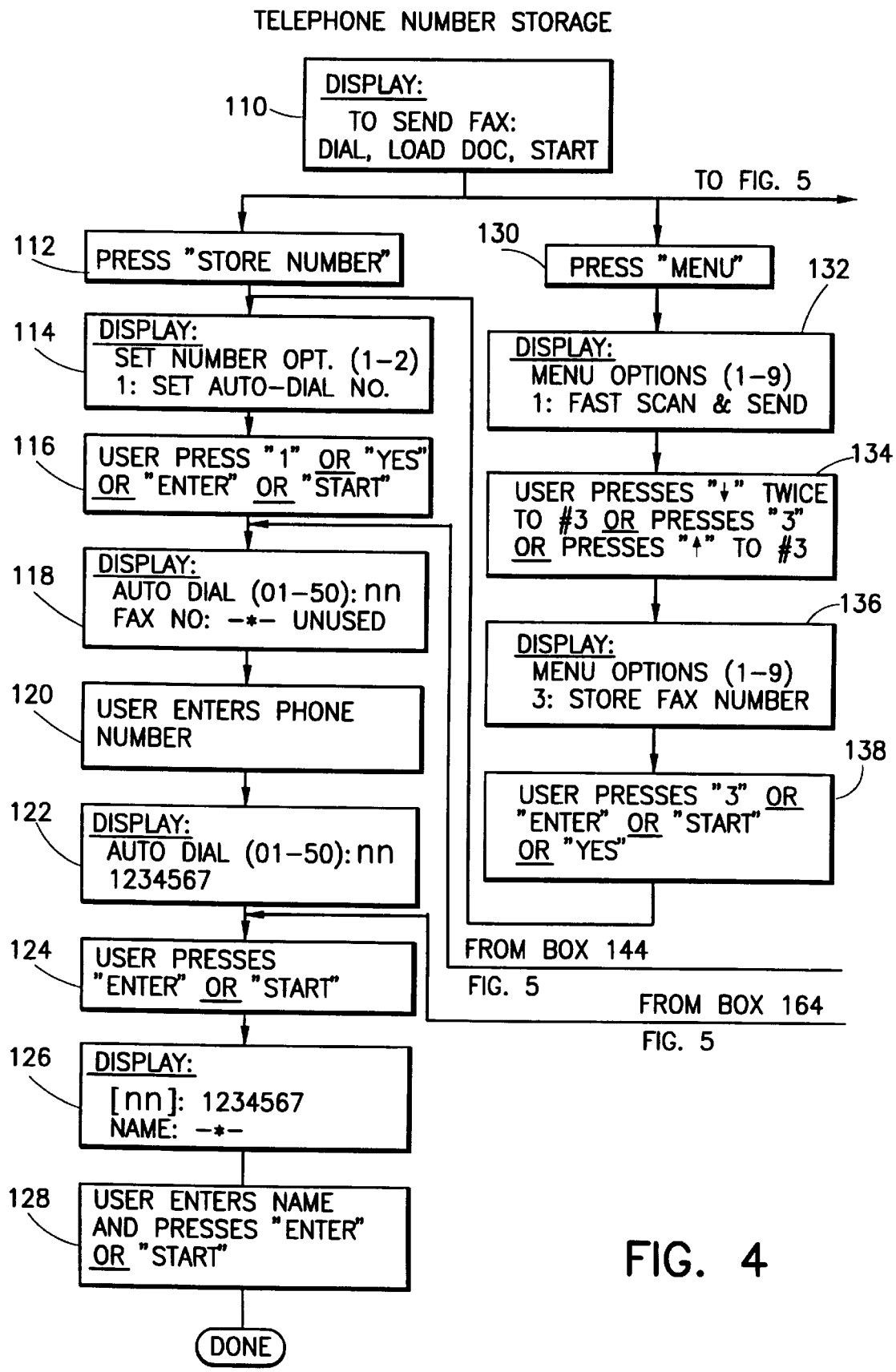
FIGS. 4 and 5 illustrate a flow diagram which describes plural pathways for accomplishing storage of a telephone number.
Figure 5:
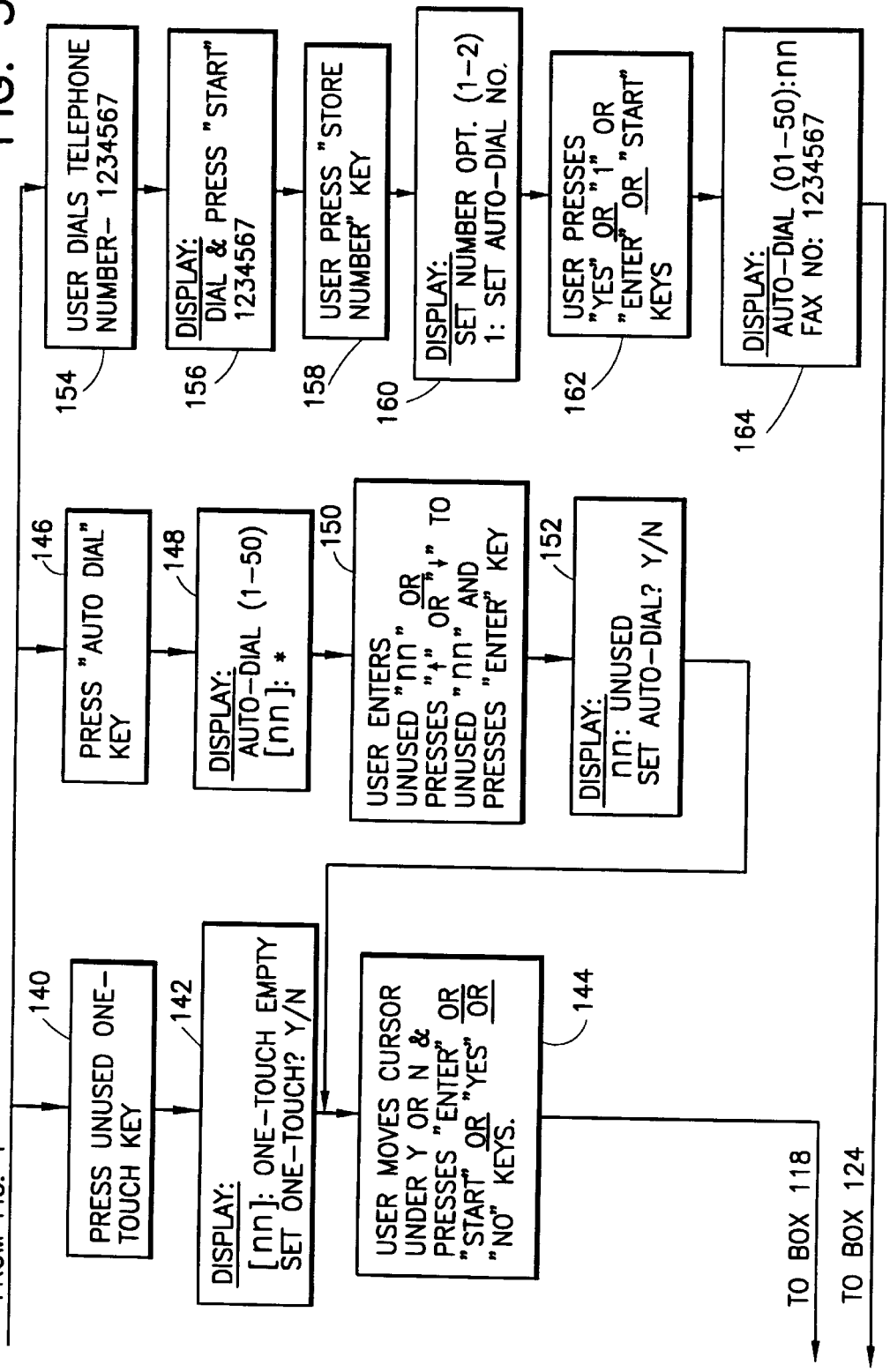

Turning to FIGS. 4 and 5, five procedure paths will be described which enable an operator to store a telephone number. Each of the boxes in FIGS. 4 and 5 which indicate "Display" show a message that appears on display panel 54. As shown at box 110, the default message "TO SEND FAX., DIAL & PRESS START" is displayed. Assuming the operator decides to press Store number key 70 (box 112), the procedure causes display 54 to indicate as follows:

SET NUMBER OPT. (1–2)
1: SET AUTO-DIAL NO.

In response, assuming the operator wishes to enter an AutoDial number, the operator may signal selection of the indicated option by either pressing the "1" (to select option #"1") or "Yes" key or Enter key 64 or Start key 66 (box 116). Any of the aforesaid key actuations indicates the operator's assent to continue with the displayed procedure. In response, display panel 54 indicates as shown in box 118 as follows:

AUTO-DIAL (01-50) nn
FAX NO..: -*- UNUSED

For exemplary purposes, it is assumed that there is memory space provided for 50 Auto-Dial numbers and that display panel 54 indicates "nn"; "nn" is the first storage position that has no pre-assigned telephone number. A flashing cursor "-*-" is positioned at the first available character position an the second line and awaits the operator's entry of a phone number (box 120). After entry of a phone number (e.g., 1234567), the display appears as follows (box 122):

AUTO-DIAL (01–50):nn
1 2 3 4 5 6 7

As the operator has finished entering telephone number 1234567 (for example), completion of the entry action is signaled. The operator may signal such completion by pressing either "Enter" key 64 or Start key 66 (box 124). At this point, display 54 indicates as shown at box 126 as follows:

[nn]: 1234567
NAME: -*-

As shown above, the flashing cursor -*- is positioned at the first character position after "NAME:" indicating that a name associated with the entered telephone number may now be entered. Such entry, once accomplished, (box 128) is followed by the operator pressing Enter key 64 or Start key 66 to complete the storage of the telephone number and the associated name.

As often occurs, the operator may not have read the instruction manual that accompanies the facsimile or may not realize that a telephone number can be entered by actuation of Store Number key 70. To accommodate such an operator, plural additional paths are available to enable storage of a telephone number. The operator may remember that actuation of Menu key 76 will cause display panel 54 to indicate a series of available functions. As a result the operator may press Menu key 76 (box 130) to obtain an initial indication as follows (box 132):

MENU OPTIONS (1–9)

1: FAST SCAN & SEND

Since the operator is not interested in the fast document scan, followed by transmittal from memory ("fast scan and send"), the operator increments the display of menu options by actuation of up or down arrow keys 78 or by actuation of an alpha-numeric (1–9) key, assuming the operator knows which number memory position the Store Number procedure occupies. In this instance, it is assumed that "Store Fax Number" procedure is present in memory position "3". As a result, upon reaching menu item 3, display 54 (box 136) indicates as follows:

MENU OPTIONS (1–9)

3: STORE FAX NUMBER

The operator may select "Store Fax Number" by either pressing the "3" or Yes alpha-numeric keys 58 or Enter key 64 or Start key 66. Actuation of any of the aforesaid keys indicates to the facsimile that the operator wishes to store a telephone number. At such point, the procedure moves to the "Store number" procedure and continues as shown at boxes 114–128.

The operator may also accomplish storage of a telephone number by either pressing an unused One-Touch key 56; by pressing Auto-Dial key 68 or by simply commencing to enter a telephone number. Each of those procedures is illustrated in FIG. 5. Assuming the operator presses an unused One-Touch key 56 (box 140), display 54 indicates as follows (box 142):

[nn]: ONE-TOUCH EMPTY

SET ONE-TOUCH? Y/N

As the cursor is positioned beneath the "Y", the operator may assent to continuing the telephone number entry procedure by either pressing Enter, Start or Yes keys. If the operator wishes to decline further movement along this path, the user may move the cursor beneath the "N" and actuate the No key (box 144). Assuming that the user has assented to proceed further along this path, the procedure moves to box 118 (FIG. 4) and continues as shown.

If the operator presses Auto-dial key 68 (box 146), display 54 indicates (box 146) as shown below:

AUTO-DIAL (1–50)

[nn]: NNNNN

The message indicates the number of the first memory position within the Auto-dial memory wherein space is available for a new telephone number. As an alterative, display 54 could also indicate position 1 in the auto-dial sequence and require the operator to sequence through the various storage positions to determine a first unused storage position. In either case, to select a particular storage position, the operator enters the unused auto-dial memory position number or presses either the up or down arrow keys to the unused memory position and then presses Enter key 64. Upon either of the actions described in box 150, display 54 indicates as follows (box 152):

nn: UNUSED

SET AUTO-DIAL? Y/N

At this point, the operator may continue the procedure as shown in box 144 etc. or may terminate the procedure by positioning the cursor under the N alpha-numeric and actuating the NO alpha-numeric key.

Finally, entry of a telephone number may be achieved by an operator entering a telephone number through sequential actuation of alpha-numeric keys 50 (154). When the complete telephone number has been entered, display 154 indicates as follows (box 156):

DIAL & PRESS START 1 2 3 4 5 6 7

However, if the operator now presses Store number key 70 (box 158), display 54 indicates the following message (box 160):

SET NUMBER OPT. (1–2)

1: SET AUTO DIAL NO.

Assuming that the operator wishes to store the previously dialed telephone number, the operator may either press the alpha-numeric key Yes or "1", or Enter key 64 or Start key 66 (box 162). In response, display 54 indicates as follows (box 164).

AUTO-DIAL (01–50): nn

FAX NO.: 1234567

As can be seen, the entered telephone number is indicated on display 54 and is ready for storage upon actuation of either Enter key 64 or Start key 66 (box 124, etc.). Thus, any of five separate input paths will accomplish storage of a telephone number for either the Auto-dial operation or for the One-touch Auto-dial operation.

Figure 6:
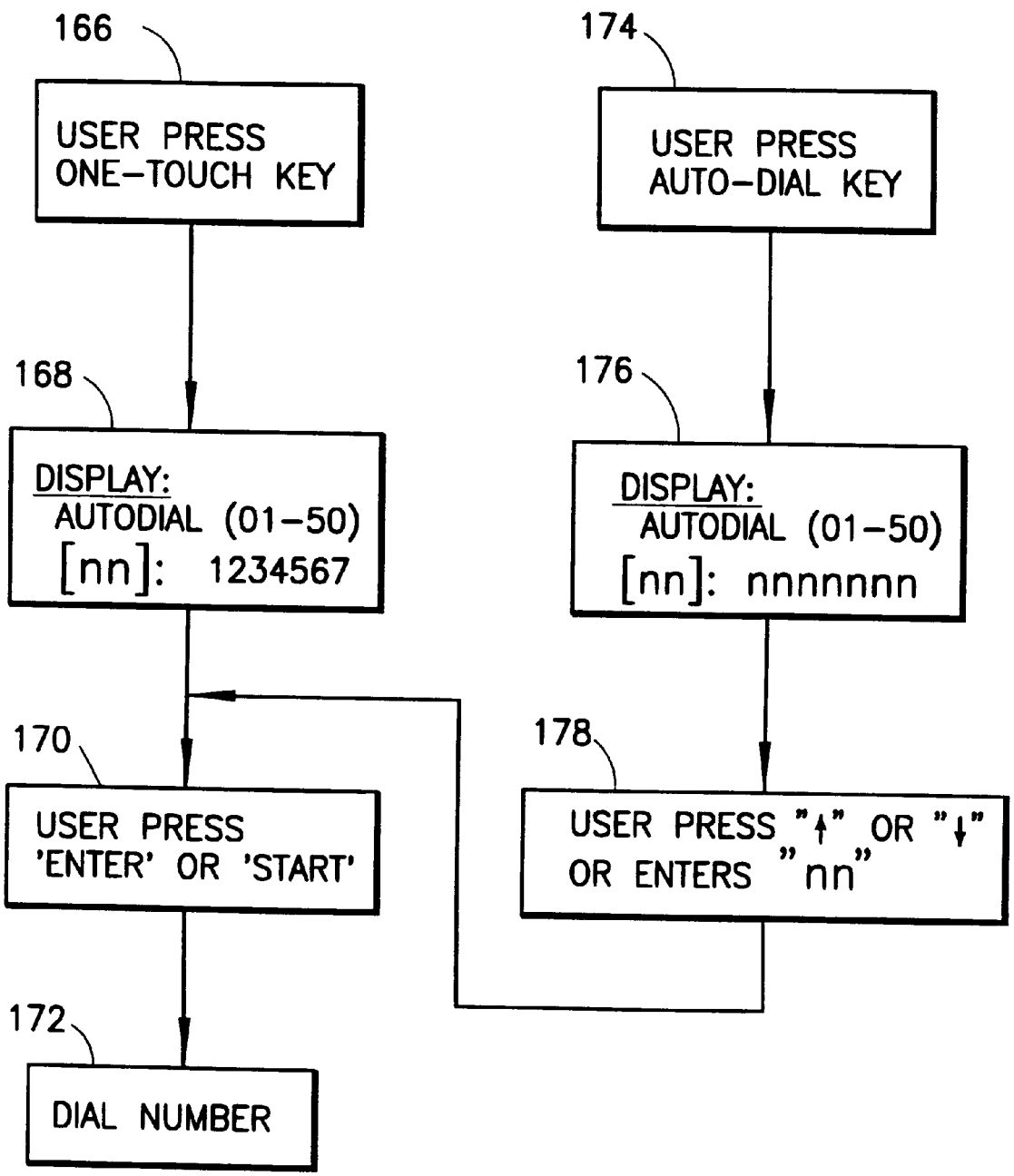
FIG. 6 is a high level flow diagram illustrating two pathways for accomplishing an auto-dial function.

The Auto-dial operation may also be accomplished by either of two procedure paths, as illustrated in FIG. 6. To implement the first path, the operator presses a One-touch key 56 which has a pre-assigned telephone number indicated (box 166). In response, display 54 indicates the particular Auto-dial memory position and its assigned telephone number as follows (box 168):

AUTODIAL (01–50)

[nn]: 1234567

To cause automatic dialing of the displayed number, the operator presses either Enter key 64 or Start key 66 (box 170) and the number is automatically dialed (box 172). In the alternative, the operator may press Auto-dial key 68 (box 174) which causes display 54 to indicate as follows (box 176):

AUTODIAL (01–50)

[nn]: NNNNNN

Assuming that display 54 indicates the first Auto-dial key storage position, the operator (box 178) then either presses up or down arrow keys 78 or enters a particular storage position number "nn" to cause display of a previously entered Auto-dial telephone number. The procedure then continues as shown in boxes 170 and 172 to accomplish the dialing of the desired number.

Undo Key

Figure 7:
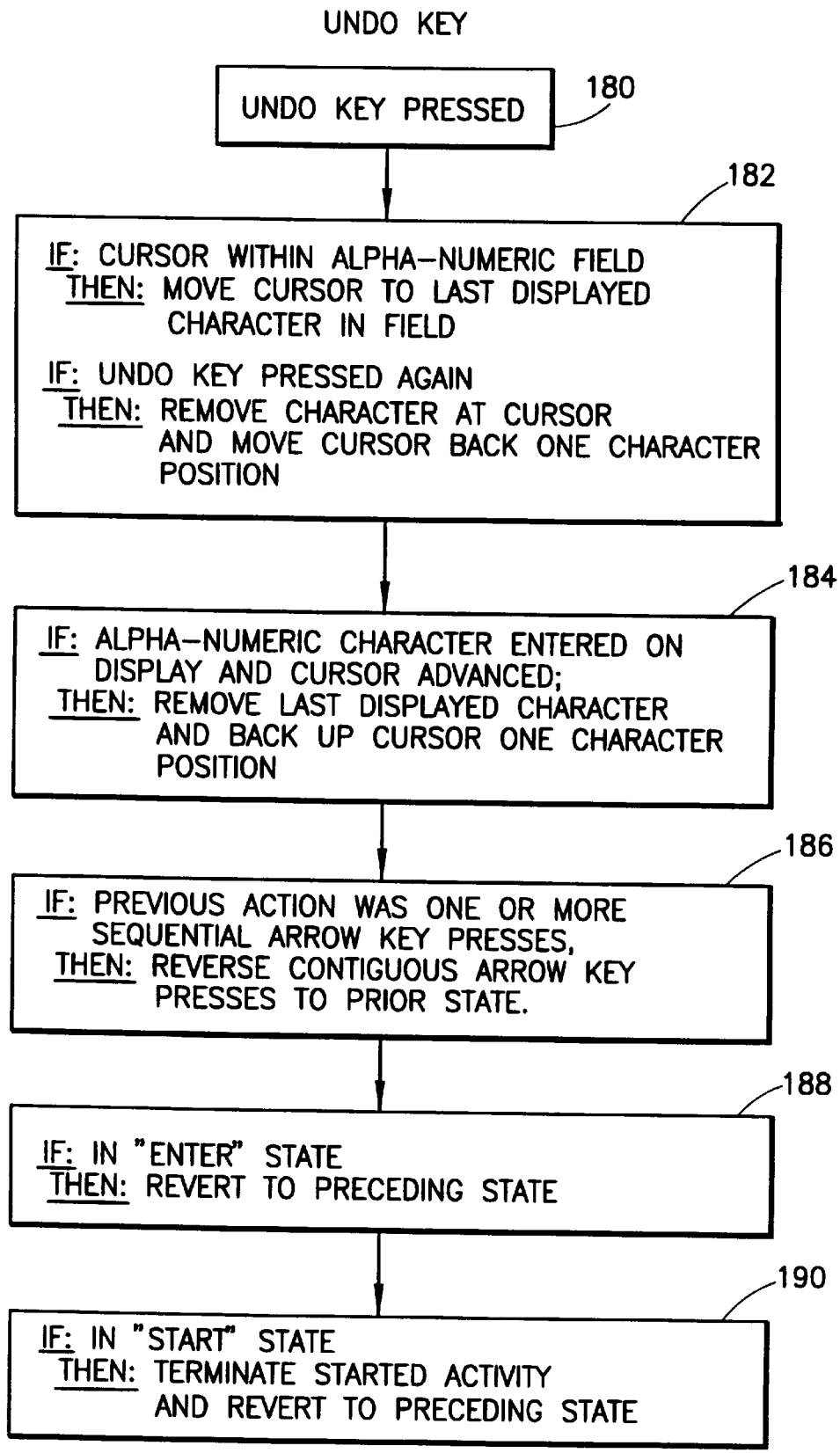
FIG. 7 is a high level flow diagram illustrating the operation which occurs when an Undo key is actuated.

As indicated above, actuation of Stop key 60 causes discontinuance of an on-going facsimile function, with display 54 reverting to the default message shown in FIG. 2. Under such a circumstance, an operator must completely restart a function sequence. To avoid this, an Undo key 66 is provided that enables incremental reversal of operator inputs. The functions performed by Undo key 62 are illustrated in FIG. 7 and commence with its actuation by the operator (box 180). If the cursor indicated on display panel 54 is within a number/name field (i.e., it is not positioned at a last entered character in the field), then actuation of Undo key 62 causes the cursor to be moved to the last entered character position within the field. A next actuation of Undo key 62 causes the character at the cursor position to be removed from display 54 and the cursor to be moved back one character position. In such manner, an alpha-numeric entry may be altered, selectively, by successive operations of Undo key 62 (box 182).

If an alpha-numeric character is entered into display panel 54, causing an advance of the cursor, a subsequent actuation of Undo key 62 causes removal of the just-entered alpha-numeric character and further causes the cursor to back up one character position (box 184).

If a previous action involved one or more arrow key presses, an actuation of Undo key 62 causes reversal of the one or more sequential arrow key presses to the state in existence prior to the arrow key presses (box 186).

As shown in box 188, if Undo key 62 is pressed after Enter key 64 has been actuated then the facsimile proceeds to a state which preceded the actuation of Enter key 64. Finally, if Undo key 62 is actuated after Start key 66 has been actuated, then whatever activity was commenced by actuation of Start key 66 is immediately terminated and the facsimile returns to the state in existence before actuation of the Start key 66.

Help Message

As a result of operator unfamiliarity with the facsimile input functions excessive time between key actuations may occur during the operation of operator panel 50. The facsimile thus automatically offers help when an excessive time delay is sensed between succeeding key actuations or when an average time delay between plural succeeding key actuations exceeds a predetermined limit. The flow diagram shown in FIG. 8 describes the procedure that enables appearance of a help message on display 54.

Initially, it is determined whether the facsimile is "in an alpha-numeric entry mode (decision box 200) and if not, the procedure recycles. If yes, a time measurement is commenced that determines an amount of elapsed time from the last alpha-numeric key press (box 202).

The elapsed time is tested against a predetermined threshold (e.g., 30 seconds) to determine if the threshold has been equalled or exceeded (decision box 204). If no, the procedure moves to determine if a key press has occurred (decision box 206) and if no, the procedure recycles and again tests for a key press. If yes, the timer is reset (box 208) and the elapsed time measurement recommences (box 202). Thus, so long as a key press occurs within the elapsed time threshold, a help message is not displayed.

If, however, the elapsed time threshold is exceeded, the procedure moves to decision box 210 where it is determined whether the offer of help message has been declined twice by operator actuation of either the No alpha-numeric key or the Undo key. If yes, the procedure ends and there is no display of the offer of help message. More specifically, if the operator has declined help twice, it is assumed that any further offer of help message will only be an annoyance.

If an offer of help message has not been declined twice, the offer of help message is displayed (box 212), including a yes/no response request. If the user responds no (decision box 214), the procedure recycles, resets the timer (box 208) and moves back to box 202 where the time measurement recommences. If however, the user responds yes, a help message is displayed (box 206) that is logically based upon the sequence of keys that have been previously actuated.

A further time measure is continuously taken to determine whether the operator is proceeding through key actuations at a rate that is slower than a predetermined threshold (indicative of a possible need for help). The rate is determined (box 220) by measuring the elapsed time from a first key press that occurs after it is determined that the procedure is in an alpha-numeric entry mode. After entry of each character, the number of displayed characters, multiplied by ten seconds (for example), is added to the elapsed time determined in box 222. That value is termed the "time sum" and changes each time a new character is displayed. As shown in decision box 224, total elapsed time is continuously tested to determine if its value exceeds the time sum.

Total elapsed time will never exceed the time sum if characters are entered at a rate that is greater than one character every ten seconds. By contrast, if the average rate of character entry is slower than 10 seconds per character, decision box 224 issues a yes indication and, as shown by decision box 226, it is again determined if the help message has been declined twice if so the procedure ends. If not, the offer of help message is displayed (box 228). If the user responds affirmatively to the help message (decision box 230), the help message is displayed (box 234). If the user responds with NO or Undo key presses, the total elapsed time is cleared to zero (box 232) and the elapsed time measurement commences again. (box 236). The procedure then recycles to box 222 and continues.

Facsimile Broadcast

Consistent with the above described multipath approaches, the operator is provided with plural procedures which allow facsimile broadcasting. The first approach is an extension of the most simple fax transmission procedure which is to dial a telephone number and press 'Start'. With this approach the operator enters the number, presses 'Enter', enters the next number, presses 'Enter' and so on until all broadcast destinations have been entered. The operator then presses 'Start' and the facsimile is transmitted in sequence to all entered numbers. As is typical throughout this invention, entering the telephone number can be accomplished either by use of keyboard 58, or by One-touch keys 56 or by Autodial key 68 together with keyboard 58.

A second approach to broadcasting is implemented in the following three menu options, "Scan & Send", "Send to Two or More", and "Schedule Fax". In each options after entering the telephone number and pressing 'Enter', the operator is prompted on Display 54 with the message "Enter another fax number? Yes/No". If the operator responds positively, he is then prompted for the next number and this action continues until the operator declines the 'Enter another . . . ' prompt.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A telecommunication unit including an operator panel with a telephone-style, alpha-numeric keyboard, a subset of keys in said keyboard each having plural-assigned alphabetic characters in addition to a numeric character assignment, said operator panel further having up, down, right and left arrow keys, an Enter key and a display panel, said telecommunication unit further comprising:

means for initiating an alpha-numeric entry mode of operation for said telecommunication unit, said alpha-numeric entry mode enabling entry of alphabetic and numeric characters into each character position in said display panel; and processor means responsive, for each said character position, to an alpha-numeric key actuation during said alpha-numeric entry mode to cause said display panel to manifest a character assigned to said actuated key, said processor means further responsive to an additional actuation of said key or actuation of an arrow key to cause a character position in said display panel to manifest other alpha-numeric characters assigned to said actuated key, said processor means responsive to each actuation of one said arrow key to cause a first character by character sequential display in a display panel character position of alpha-numeric characters assigned to an actuated alpha-numeric key, and to each actuation of another said arrow key to cause a second character by character sequential display in said character position of alpha-numeric characters assigned to said actuated alpha-numeric key, said second sequential display being opposite in sequence to said first sequential display, said processor means thereafter responsive to a further key activation to continue display of a character in said character position and to increment a cursor to a next character position.

2. A telecommunication unit including an operator panel with a telephone-style alpha-numeric keyboard, a subset of keys in said keyboard each having plural-assigned alphabetic characters in addition to a numeric character assignment, said operator panel further having up, down, right and left arrow keys, an Enter key and a display panel, said telecommunication unit further comprising:

means for initiating an alpha-numeric entry mode of operation for said telecommunications unit, said alpha-numeric mode enabling entry of alphabetic and numeric characters into character positions in said display panel; and processor means for displaying a cursor on said display panel at a first character position where a first character has been displayed in response to actuation of an alpha-numeric key, said processor means further responsive to a next actuation of an alpha-numeric key or said Enter key or said right arrow key, to move said cursor to a next character location, to maintain display of said first alpha-numeric character and to display a character at said next character location that is assigned to said alpha-numeric key that is next actuated.

3. The telecommunications unit as recited in claim 1, wherein said one arrow key is an up arrow key and said another arrow key is a down arrow key.

4. A telecommunication unit including an operator panel with a telephone-style alpha-numeric keyboard, a subset of keys in said keyboard each having plural assigned alphabetic characters in addition to a numeric character assignment, said operator panel further having an Enter key, a Start key and a display panel, said telecommunications unit further comprising:

means for initiating an alpha-numeric entry mode of operation for said telecommunication unit, said alpha-numeric entry mode enabling entry of alphabetic characters assigned to each of said keys; and processor means for displaying a cursor on said display panel, said processor means responsive to entry actions comprising said cursor being positioned at a blank character position on said display panel and an actuation of either said Start or Enter key, by commencing neither a Start action nor an entry action, but rather causing a display of a message which, if responded to by a user, enables said processor to take a further action to control said telecommunication unit.

5. A method for entry of alpha-numeric characters in a telecommunication unit that includes an operator panel with a telephone-style, alpha-numeric keyboard, a subset of keys each having plural-assigned alphabetic characters in addition to a numeric character assignment, and up, down, right, left arrow keys, an Enter key and a display panel, said method comprising the steps of:

(a) initiating an alpha-numeric entry mode of operation for said telecommunication unit, said alpha-numeric entry mode enabling entry of alphabetic and numeric characters into each character positions in said display panel;

and for each said character position:

(b) responding to an alpha-numeric key actuation during said alpha-numeric entry mode to cause said display panel to manifest a character assigned to said actuated key;

(c) responding to either an additional actuation of said key to cause a character position in said display panel to manifest other alpha-numeric characters assigned to said actuated key; and (d) responding to repeated actuations of one said arrow key to cause a first character by character sequential display in a display panel character position of alpha-numeric characters assigned to said actuated alpha-numeric key, and repeated actuations of another said arrow key to cause a second character by character sequential display in said character position of alpha-numeric characters assigned to said actuated alpha-numeric key, said second sequential display being opposite in sequence to said first sequential display; and (e) thereafter responsive to a further key activation to continue displaying of a character in said character position and to increment a cursor to a next character position.

6. A method for entry of alpha-numeric characters in a telecommunication unit that includes an operator panel with a telephone-style alpha-numeric keyboard, a subset of keys in said keyboard each having plural-assigned alphabetic characters in addition to a numeric character assignment, said operator panel having up, down, right and left arrow keys, an Enter key and a display panel, said method comprising the steps of:

(a) initiating an alpha-numeric entry mode of operation for said telecommunications unit, said alpha-numeric mode enabling entry of alphabetic and numeric characters into character positions in said display panel;

(b) displaying a cursor on said display panel at a first character position where a first alpha-numeric character has been displayed in response to actuation of an alpha-numeric key;

(c) responding to a next actuation of an alpha-numeric key, to move said cursor to a next character location, and to maintain display of said first alpha-numeric character, and to display a character at said next character location that is assigned to said alpha-numeric key that is next actuated; or (d) responding to actuation of either said Enter key or said right arrow key to move said cursor to a next character position; and (e) maintaining display of said first alpha-numeric character at said first character position.

7. A method for enabling entry of alpha-numeric characters in a telecommunication unit that includes an operator panel with a telephone-style alpha-numeric keyboard, a subset of keys in said keyboard each having plural assigned alphabetic characters in addition to a numeric character assignment, said operator panel having an Enter key, a Start key and a display panel, said method comprising the steps of:

(a) Initiating an alpha-numeric entry mode of operation in said telecommunication unit, said alpha-numeric entry mode enabling entry of alphabetic characters assigned to each of said keys;

(b) Displaying a cursor on said display panel:
  (c) responding to entry actions comprising said cursor being positioned at a blank character position on said display panel and an actuation of either said Start key or Enter key, by displaying a message requesting a user response in lieu of performing either a Start action or an entry action, a user response to said message causing performance of a further action in accordance with said response.

8. A facsimile unit including an operator panel, an alpha-numeric keyboard, a display panel and plural function keys, each said function key, upon actuation, causing a procedure path to be invoked that results in accomplishment of a predetermined input function associated with said key, said facsimile unit including multiple procedure paths for enabling an operator to accomplish at least certain of said predetermined input functions, said facsimile unit comprising:
  processor means responsive to user actuation of a first function key to invoke a procedure path to accomplish said first function and which requires user actuation of at least an additional key on said keyboard, said additional key operated only in a determined sequence so as to accomplish said predetermined input function, said processor means further responsive to a user's actuation of a different sequence of keys on said operator panel to accomplish a same predetermined input function as indicated for said first function key, one key of said different sequence of keys being a Menu key on said operator panel, said processor means responding to actuation of said Menu key by causing said display panel to indicate said first function, said processor means further responsive to actuation of another key after said Menu key, to enable selection of said first function indicated on said display panel, said different sequence determined based upon a user's likely sequence of selection of keys on said operator panel to accomplish said predetermined input function.

9. The facsimile unit as recited in claim 8, wherein said operator panel includes an Enter key, a Start key and first and second numeric keys having no alphabetic assignments but recognized by said processor means as yes and no entries, respectively, said processor means further responsive to a display of said predetermined input function on said display panel as a result of actuation of said Menu key and said another key, and an actuation of said Enter key or Start key or said first numeric key to invoke a procedure to accomplish a predetermined input function that is displayed.

10. The facsimile unit as recited in claim 8, wherein said first function key indicates a storage of a telephone number, and actuation of said menu key and said another key enables display of a function that also enables storage of a telephone number, said processor means further responsive to actuation of a second function key on said operator panel to enable operation of a telephone number storage procedure and to subsequently display a message inquiring whether a telephone number is to be stored, said processor means responsive to an affirmative operator input to invoke a telephone number storage procedure similar to that invoked by actuation of said first function key.

11. The facsimile unit as recited in claim 10, wherein said operator panel includes a plurality of one-touch keys, each of which, when actuated, automatically causes a pre-assigned telephone number to be dialed by said facsimile unit, said processor means responsive to actuation of a one-touch key having no pre-assigned telephone number to enable a user to invoke a telephone number storage procedure for said one-touch key that is substantially similar to that invoked by actuation of said first function key.

12. The facsimile unit as recited in claim 10 wherein said operator panel includes an auto-dial function key which when actuated, enables a pre-assigned telephone number to be auto-dialed by said facsimile unit, said processor means responsive to an operator's selection of an unused memory position employed for said auto-dial function, to enable a telephone entry procedure for recording a telephone number thereinto, said entry procedure employing a storage procedure similar to that invoked by actuation of said first function key.

13. The facsimile unit as recited in claim 10 wherein said processor means is further responsive to an operator entered telephone number via said alpha-numeric keyboard to display a message on said display panel that inquires of said operator whether said operator-entered telephone number is to be stored, and further responsive to an affirmative operator response, to store said entered telephone number for later access by said auto-dial key.

14. A method for alpha-numeric entry in a facsimile unit that includes an operator panel, an alpha-numeric keyboard, a display panel and plural function keys, each function key, upon actuation, causing a procedure path to be invoked that results in accomplishment of a predetermined input task associated with said key, said facsimile unit including multiple procedure paths for enabling an operator to accomplish at least certain of said predetermined input tasks, said method comprising the steps of:
  (a) responding to user actuation of a first function key to invoke a procedure path that requires user actuation of at least an additional key on said keyboard in a determined sequence as to accomplish said predetermined input task; and
  (b) responding to a user's actuation of a different sequence of keys on said operator panel, one of said keys being a menu key, to accomplish a same predetermined input task as indicated for said first function key by
    (i) responding to an actuation of said Menu key to cause said display panel to indicate a first input task that is performable by said facsimile unit and for which said first function key is also provided; and
    (ii) responding to a further actuation of another key, to enable selection of said first input task that is available from said displayed menu.

15. The method as recited in claim 14, wherein said operator panel includes an Enter key, a Start key and first and second numeric keys having no alphabetic assignments but recognized by said processor means as yes and no entries, respectively, said method comprising the added step of:
  (c) responding to a display of said predetermined input task on said display panel as a result of actuation of said Menu key and said another key, and an actuation of said Enter key or Start key or said first numeric key to invoke a procedure to accomplish a predetermined input task that is displayed.

16. The method as recited in claim 15, wherein said first function key indicates a storage of a telephone number, and actuation of said menu key and said another key enabling display of a function that also enables storage of a telephone number, said method comprising the additional step of:
  (d) responding to actuation of a second function key on said operator panel to enable operation of a telephone number storage procedure and to subsequently display a message inquiring whether a telephone number is to be stored; and
  (e) responding to an affirmative operator input to invoke a telephone number storage procedure as invoked by actuation of said first function key.

17. The method as recited in claim 16, wherein said operator panel includes a plurality of one-touch keys, each of which when actuated automatically enables a pre-assigned telephone number to be dialed by said facsimile unit, and comprising the added step of:

responding to actuation of a one-touch key having no pre-assigned telephone number to enable a user to invoke a telephone number storage procedure as invoked by actuation of said first function key.

18. The method as recited in claim 16 wherein said operator panel includes an auto-dial function key which, when actuated, enables a pre-assigned telephone number to be auto-dialed by said facsimile unit and comprising the added step of:

responding to an operator's selection of an unused memory position employed for said auto-dial function, to enable a telephone entry procedure for recording a telephone number thereinto, said entry procedure employing a storage procedure as invoked by actuation of said first function key.

19. The method as recited in claim 16 comprising the added steps of:

responding to an operator entered telephone number via said alpha-numeric keyboard to display a message on said display panel that inquires of said operator whether said operator-entered telephone number is to be stored; and further responding to an affirmative operator response, to store said entered telephone number for later access by said auto-dial key.

* * * * *